(12) United States Patent
Staub et al.

(10) Patent No.: US 6,417,968 B1
(45) Date of Patent: Jul. 9, 2002

(54) DIFFRACTIVE SURFACE PATTERN

(76) Inventors: René Staub, Schmiedstrasse 6, CH-6330 Cham; Wayne Robert Tompkin, Oesterliwaldweg 2, CH-5400 Baden, both of (CH)

(*) Notice: Subject to any disclaimer, the term of this patent is extended or adjusted under 35 U.S.C. 154(b) by 0 days.

(21) Appl. No.: 09/601,063

(22) PCT Filed: Dec. 29, 1998

(86) PCT No.: PCT/EP98/08492
§ 371 (c)(1),
(2), (4) Date: Jul. 27, 2000

(87) PCT Pub. No.: WO99/38038
PCT Pub. Date: Jul. 29, 1999

(30) Foreign Application Priority Data

Jan. 27, 1998 (CH) .................................. 190/98

(51) Int. Cl.⁷ ..................... G02B 5/18; B42D 15/10; B42D 209/00
(52) U.S. Cl. .................. 359/567; 359/566; 359/569; 359/571; 283/85; 283/86
(58) Field of Search ............... 359/2, 566, 567, 359/569, 571, 572; 283/85, 86

(56) References Cited

U.S. PATENT DOCUMENTS

| | | | | |
|---|---|---|---|---|
| 3,515,459 A | * | 6/1970 | Wood | 359/567 |
| 4,414,784 A | * | 11/1983 | Knop et al. | 283/91 |
| 4,588,212 A | * | 5/1986 | Castagnoli | 283/91 |
| 5,059,776 A | | 10/1991 | Antes | 359/2 |
| 5,101,184 A | | 3/1992 | Antes | 283/91 |
| 5,301,062 A | * | 4/1994 | Takahashi et al. | 359/569 |
| 5,712,730 A | * | 1/1998 | Zarschitzky et al. | 359/569 |
| 5,714,213 A | * | 2/1998 | Antes et al. | 283/91 |
| 5,784,200 A | * | 7/1998 | Modegi | 359/2 |
| 5,909,313 A | * | 6/1999 | Lee | 359/569 |
| 6,262,845 B1 | * | 7/2001 | Sweatt | 359/569 |

FOREIGN PATENT DOCUMENTS

| | | |
|---|---|---|
| EP | 0 105 099 A1 | 4/1984 |
| EP | 0 360 969 A1 | 4/1990 |
| EP | 0 375 833 A1 | 7/1990 |
| EP | 0 401 466 A1 | 12/1990 |
| EP | 0 201 323 B1 | 8/1994 |
| WO | WO 97/19882 | * 6/1997 |

* cited by examiner

Primary Examiner—Cassandra Spyrou
Assistant Examiner—John Juba, Jr.

(57) ABSTRACT

A surface pattern is made up of surface elements (1 to 7) which are arranged in a mosaic-like fashion and which have microscopic relief structures. The surface elements (2 to 6) which are divided at least into first and second surface portions (8; 9) have in the first and second surface portions (8; 9) asymmetrical diffraction gratings (12; 13) with an optical diffraction effect, wherein in each divided surface element (2 to 6) adjacent first surface portions (8) are separated by at least one second surface portion (9). The grating vectors of the asymmetrical diffraction gratings (12) of the first surface portions (8) of all divided surface elements (2 to 6) have the same first value in respect of azimuth and the asymmetrical diffraction gratings (13) of the second surface portions (9) of all divided surface elements (2 to 6) have the same second value in respect of azimuth. The divided surface elements (2 to 6) are arranged in accordance with their surface proportion value $A_N$ in the mosaic of all surface elements (1 to 7). The surface proportion value $A_N$ of the N-th divided surface element is the relationship of the sum of all first surface portions (8) to the total area of all first and second surface portions (8; 9).

16 Claims, 3 Drawing Sheets

DIFFRACTIVE SURFACE PATTERN

BACKGROUND OF THE INVENTION

1. Field of the Invention

The invention relates to an arrangement of surfaces with an optical diffraction effect, as set forth in the classifying portion of claims 1 and 7.

Surface patterns of that kind are additionally used to enhance the level of safeguard against forgery in relation to optical-diffraction security elements which are made up of holograms and/or diffraction gratings of a mosaic-like composition.

2. Description of the Prior Art

An arrangement of the kind set forth in the opening part of this specification, in relation to optical-diffraction security elements, is known from EP-A 105 099 and EP-A 375 833. EP-A 105 099 describes the production of variable patterns of surface portions which have an optical diffraction effect and which are glued for example in the form of a stamp on a document and authenticate that it is genuine. When the security feature is illuminated, those surface portions are successively lit up upon rotation about an axis perpendicularly to the plane of the security feature, along a path. EP-A 375 833 describes a security element whose surface is divided into grid fields or areas and each grid field or area is subdivided into a number of field portions. The number of field portions per grid field determines the number of motifs or images which are successively visible at predetermined viewing directions. The same field portions of all grid fields form the picture elements (=pixels) of one of the images or motifs and they have such grating structures that the image or motif is visible only from one predetermined direction. The brightness of a pixel of the image is predetermined by the surface proportion of the diffraction structure in the field portion.

It is also known from EP-A 0 360 969 for at least one optical diffraction element of the optical-diffraction authenticity feature to be subdivided into two surface portions whose microscopically fine asymmetrical diffraction gratings only differ in terms of azimuth through 180°, with the other grating parameters otherwise being the same. With those subdivided diffraction elements, machine-readable information can be inconspicuously disposed in a visually perceptible pattern.

U.S. Pat. No. 5,059,776 shows a barcode area which is divided into bar elements and background elements, according to the bar coding. The surfaces of all bar elements are occupied by a first asymmetrical relief profile and the surfaces of all background elements are occupied by a second asymmetrical relief profile. The sequence of wide and narrow bar elements is determined by the information in the bar code area.

The above-listed documents describe security elements without effectively utilising brightness modulation within relatively large areas which can be well perceived by the naked human eye.

In addition EP-A 0 401 466 describes a plastic laminate with embedded, microscopically fine, optically effective relief structures and the use thereof as a security element. The materials which can be used are known for example from EP 0 201 323 B1.

OBJECTS AND SUMMARY OF THE INVENTION

The object of the invention is to provide an inexpensive surface pattern which is difficult to forge even with holographic copying processes, with a new authenticity feature which is readily visible in diffuse light, for optical-diffraction security elements.

In accordance with the invention that object is attained by the features recited in the characterising portions of claims 1 and 7. Advantageous configurations of the invention are set forth in the appendant claims.

Embodiments of the invention are described in greater detail hereinafter and illustrated in the drawings.

BRIEF DESCRIPTION OF THE DRAWING

FIG. 3 shows the divided surface element with a strip structure,

DETAILED DESCRIPTION OF THE INVENTION

Figure 1:
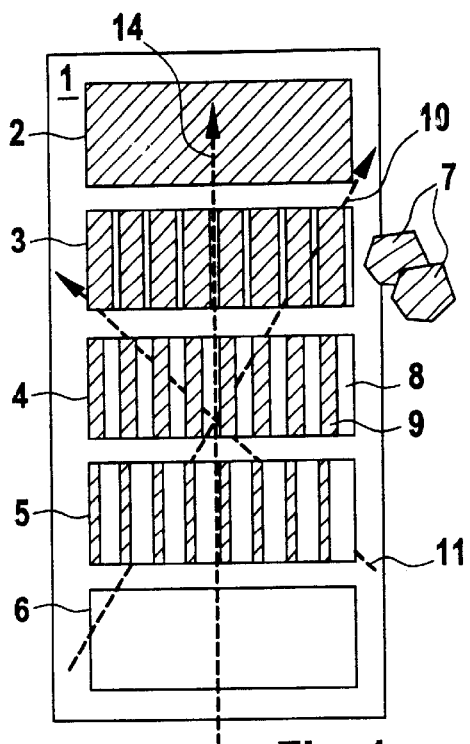
FIG. 1 shows a surface pattern.

In FIG. 1 reference 1 denotes a background field, references 2 to 7 denote surface elements, reference 8 denotes first surface portions, reference 9 denotes second surface portions, and references 10 and 11 denote marked or pronounced directions. The background field 1 is as a surface element part of a surface pattern of an optical-diffraction security element. The surface pattern is composed in mosaic-like manner from surface elements 1 to 7 etc which have an optical diffraction effect or which are reflecting or which have a scattering action or which are transparent, wherein the outer boundary of the surface elements 1 to 7 and the surface portions 8 and 9 are not subject to any limitation; in FIG. 1, it is purely for reasons of clarity of the drawing that the surface elements 1 to 7 and the surface portions 8, 9 are illustrated as rectangles and only two of the plurality of the surface elements 7 forming the surface pattern are shown. The surface elements 2 to 7 have microscopic relief structures (holograms, kinoforms, diffraction gratings of all kinds) which diffract or scatter incident light, or are transparent or reflecting over the whole or a part of the surface. The microscopic relief structures are embedded in a plastic laminate. Production of the plastic laminate and the materials which can be used are known from the above-mentioned specifications (EP-A 401 466; EP 0 201 323 B1).

Figure 2A:
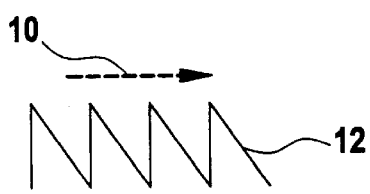
FIG. 2a shows an asymmetrical diffraction grating.
Figure 2B:
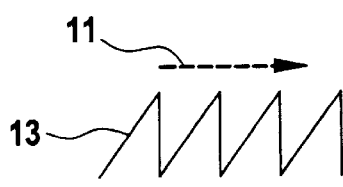
FIG. 2b shows the asymmetrical diffraction grating rotated through 180°.

At least one asymmetrical diffraction grating 12 and 13 respectively, as shown in FIGS. 2a and b, is shaped on the surface of the surface elements 2 to 6 which are referred to hereinafter as 'divided surface elements'. The first asymmetrical diffraction grating 12 shown in FIG. 2a has a grating vector parallel to the first marked direction 10. In FIG. 2b the grating vector of the second asymmetrical diffraction grating 13 is in anti-parallel relationship to the second marked direction 11.

FIG. 1 shows the divided surface elements 2 to 6. A plurality thereof is divided at least into the first and second surface portions 8 and 9, wherein for reasons of clarity of the drawing the first surface portions 8 are shown light and the second surface portions 9 are shown dark. The first surface portions 8 are occupied by the first asymmetrical diffraction grating 12 (FIG. 2a), in which respect the grating vector is oriented from each diffraction grating 12 in parallel relationship with the first marked direction 10. The grating vectors of the second asymmetrical diffraction grating 13 (FIG. 2b) in the second surface portions 9 are all in anti-parallel relationship with the second marked direction 11. The marked direction 11 and 12 respectively therefore determines the azimuth of the grating vector of all first asymmetrical diffraction gratings 12 and the azimuth of the grating vector of all second asymmetrical diffraction gratings 13 of the surface elements 2 to 6. In each divided surface element 2 to 6 adjacent first surface portions 8 are separated by at least a second surface portion 9. The asymmetrical diffraction gratings 12 and 13 in the two surface portions 8 and 9 differ at least in terms of the azimuth.

The divided surface elements 2 to 6 have different surface proportions of the surface portions 8 and 9, in which respect there is associated with each of the divided surface elements 2 to 6, for example the N-th divided surface element, a predetermined surface proportion value $A_N$ which is calculated from the total of the surface areas of all first surface portions 8 of the N-th divided surface element in relation to the total surface area of all first surface portions 8 and all second surface portions 9 of the N-th divided surface element (range of values from 0 to and including 1).

The divided surface elements 2 to 6 are arranged in accordance with their surface proportion value $A_N$ in the mosaic of all surfaces elements 1 to 7. In the example of FIG. 1, this is along a common marked axis 14 in parallel relationship to a longitudinal side of the background field 1, wherein the divided surface element 2 has the surface proportion value $A_2=0$ and the divided surface element 6 has the surface proportion value $A_6=1$, and the remaining surface proportion values $A_3$, $A_4$ and $A_5$ of the divided surface elements 3 to 5 are so arranged in accordance with their surface proportion values $A_N$ that $0<A_3<A_4<A_5< \ldots <1$. Instead of that monotonic sequence of the surface proportion values $A_N$ along the axis 14, it is also possible to implement other arrangements, in which case the surface proportion values $A_N$ follow a function F which is steady at least in a portion-wise manner. The common marked axis 14 can for example also be selected parallel to the vectorial sum of the first and the second marked directions 10 and 11 and does not have to be oriented along a boundary of the background field 1. The spacing of the divided surface elements 2 to 6 from the axis 14 depends on the configuration of the surface pattern.

In the case of perpendicularly incident light the asymmetrical diffraction gratings 12 and 13 diffract the light in the plane which is determined by the direction of the incident light and the grating vector, wherein the diffraction angles depend on the diffraction order, the spatial frequency of the diffraction grating and the wavelength of the light. The direction of the grating vector is a preferred direction in the case of the asymmetrical diffraction gratings 12, 13, and therefore light is diffracted with a greater level of intensity into the positively counted diffraction orders than into the negatively counted ones. In the case of the positively counted diffraction orders, the direction of the diffracted light has a component in the direction of the grating vector, while in the case of the negatively counted diffraction orders that component is in opposite relationship to the grating vector. The diffraction gratings with rectilinear channel lines are visible as a colored surface only in a narrow range of the azimuth which is predetermined by the direction of the grating vector, $\phi$ and $\phi+180°$ respectively.

This ordered series of divided surface elements 2 to 6 enjoys the advantage that, with predetermined illumination and upon being viewed in one of the marked directions 10 and 11, the overall brightness of each of the surface elements 2 to 6 changes according to its surface proportion value $A_N$ steadily or in steps of the predetermined function F along the axis 14. The security feature is perceived when, as in EP-A 105 099, the surface pattern is rotated about an axis of rotation which is perpendicular to the security element, from one marked direction 10 or 11 into the other marked direction 11 or 10 respectively. Only the surface portions 8 are visible in the marked direction 10, in which case the brightness decreases from the divided surface element 6 towards the divided surface element 2. In the marked direction 11 only the second surface portions 9 are visible and the brightness of the second surface portions 9 decreases in the reverse direction. Upon a rotation through 180° only the absolute brightness of the surface elements 2 to 6 changes and is difficult to perceive without a reference. The background area 1 can serve as a reference. The background area 1 as a reference can be occupied in the free surfaces which are not covered by the surface elements 2 to 6, by a symmetrical diffraction grating or by one of the two asymmetrical diffraction gratings 12 and 13. The eye compares the brightness of the surface elements 2 to 6 with the constant brightness of the background area 1. The change in overall brightness is perceived in a particularly striking fashion if the naked human eye can only still perceive with difficulty the division into the first and second surface portions 8 and 9, that is to say if the surface portions 8 and 9 measure at least in one direction less than 1 mm (preferably even less than 0.5 mm).

Under normal viewing conditions (sunshine, spotlight source), the two asymmetrical diffraction gratings 8 and 9 impart a color which is dependent on the grating frequency, to the corresponding surface portions 8 and 9. Many uses involve selecting for the two asymmetrical diffraction gratings 8 and 9, identical microscopically fine reliefs which, except for azimuth, involve identical grating parameters (spatial frequency, relief shape etc) so that the viewer sees the surface portions 8 and 9 as being of the same color.

If the first asymmetrical diffraction grating 12 of the first surface portions 8 differs from the second asymmetrical diffraction grating 13 of the second surface portions 9 in terms of the value of the azimuth precisely by 180°, that is to say if the directions 10, 11 and 14 are parallel, then both surface portions 8 and 9 are visible in the common marked axis 14; they differ however at least in respect of brightness. If for example an observer views the surface pattern in the direction of the common marked axis 14, the grating vector of the first asymmetrical diffraction gratings 12 points away from the observer. Therefore the first surface portions 8 appear to be less light than the second surface portions 9 whose second asymmetrical diffraction grating 13 preferably diffracts the light in the direction of the observer. From the point of view of the observer, the brightness of the surface elements 6 to 2 which are arranged on the common marked axis 14 increases with increasing distance from his eye, as the proportion of the second surface portions 9 increases, at the expense of the first surface portions 8. After a rotation of the surface pattern in its plane through 180°, the same distribution of brightness presents itself to the observer, contrary to his expectation, as now the first surface portions 8 are lighter than the second surface portions 9 because the first asymmetrical diffraction gratings 12 of the first surface portions 8 preferably diffract the light in the direction of the observer. The advantage of this security feature is simple checking by a rotational movement of the surface pattern in its plane through 180°.

Figure 3A:
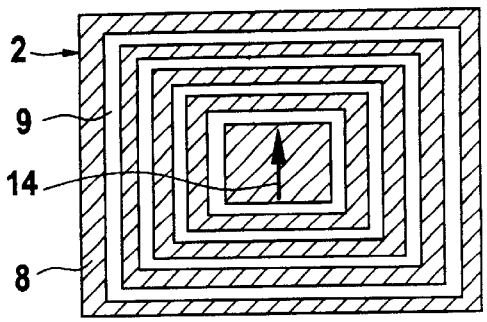
FIG. 3a shows another divided surface element in a given orientation.

FIG. 3a shows another division of the surface element 2, wherein the first surface portions 8 and the second surface portions 9 are mutually interlocking, similar strips in the form of rectangles. It will be appreciated that these mutually interlocking, similar strips may be in the form of circular rings, meander configurations, any polygons and so forth. The shape of the strips depends on the graphic content of the surface element 2. The common marked axis 14 in the inner rectangle shows the orientation of the grating vectors of the asymmetrical diffraction gratings 12 (FIG. 2a) and 13 (FIG. 2b), wherein in the darkly colored first surface portions 8 the grating vector is in parallel relationship with the axis 14 and in the lightly colored second surface portions 9 the grating vector is in anti-parallel relationship with the axis 14. Upon perpendicular illumination and with the viewing direction in the direction of the axis 14, the second surface portions 8 which are light in the drawing in FIG. 3a appear lighter than the darkly colored first surface portions 8.

Figure 3B:
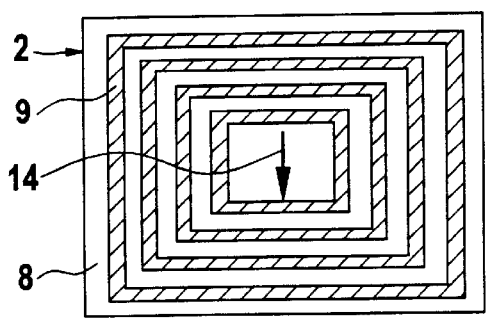
FIG. 3b shows the divided surface element rotated through 180°.

FIG. 3b shows the same surface element 2 under the same conditions in terms of illumination and observation direction as in FIG. 3a, but the surface element 2 is rotated through 180° in its plane, as indicated by the arrow in relation to the axis 14. Here, the brightness values of the surface portions 8 and 9 are interchanged because of the use of the asymmetrical diffraction gratings 12 (FIG. 2a) and 13 (FIG. 2b). The first surface portions 8 now appear light and the second surface portions 9 dark.

So that the shape and the change in brightness of the innermost surface portion 8 acts sufficiently conspicuously on the observer, the innermost surface portion 8 is to be selected to be sufficiently large (>1 mm²). The conspicuous change in brightness affords the advantage of simple checking of this security feature. The feature is self-referring, the totality of the strips of the surface portions 8, 9 around the innermost surface portion 8 form a frame whose brightness differs from the brightness of the innermost surface portion 8.

In another embodiment the widths of the surface portions 8 and 9 change in the radial direction, for example the width of the second surface portions 9 is increased at the expense of the first surface portions 8 and so forth.

Figure 4:
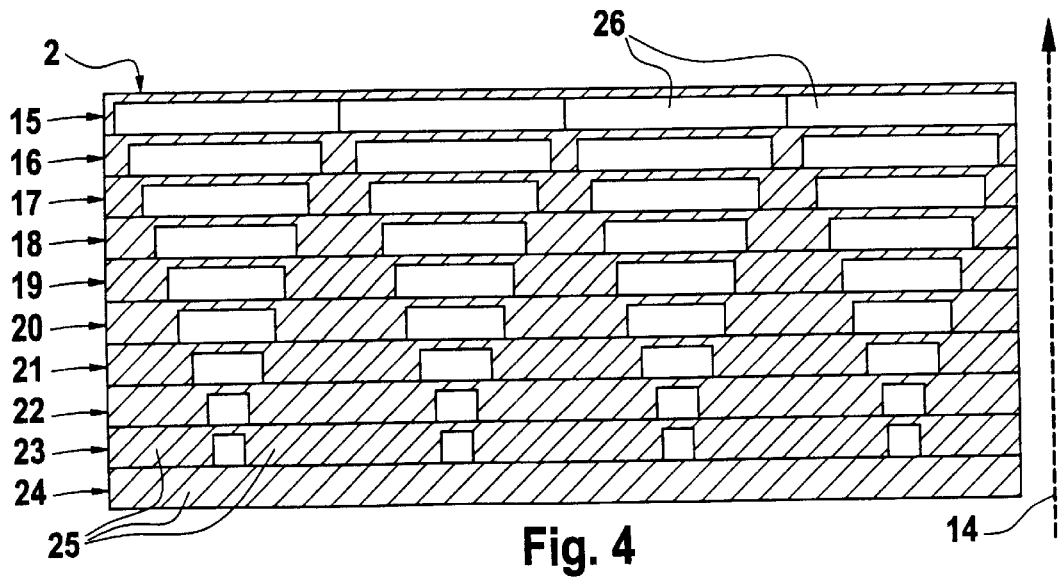
FIG. 4 shows the divided surface elements which are apparently invariant in relation to a rotation through 180°.

FIG. 4 shows a further division of the divided surface element 2 into strips 15 to 24 which are subdivided into first and second surface portions 25 and 26. The first surface portions 25 are occupied by the first asymmetrical diffraction grating 12 (FIG. 2a) and the second surface portions 26 are occupied by the second asymmetrical diffraction grating 13 (FIG. 2b) in such a way that the grating vectors of the two asymmetrical diffraction gratings 12 and 13 are oriented in anti-parallel relationship and along the direction of the common marked axis 14, for example in transverse relationship with the strip structure of the divided surface element 2. With the perpendicular illumination direction and with the observation direction which is predetermined by the common marked axis 14 the second surface portions 26 appear lighter than the first surface portions 25 which are illustrated as being dark in the drawing of FIG. 4. The strips 15 to 24 have different surface proportion values $A_N$ in respect of the surface portions 25 and 26, wherein there is associated with each of the strips 15 to 24, for example the N-th strip, a predetermined surface proportion $A_N$ in the range of between 0 and 1, which is calculated from the total of all first surface portions 25 of the N-th strip in relation to the total surface area of all first surface portions 25 and all second surface portions 26 of the N-th strip. The surface proportion value $A_N$ decreases in the direction of the common marked axis 14 from $A_{24}=1$ to zero for $A_{15}$. If the diagonal of the surface portions 25 and 26 in the strips 15 to 23 is below the value 0.5 mm, then, because of the limited resolution capability of the human eye, each of the strips 15 to 23 is of a uniform brightness which in the illustrated example differs from the brightness of the adjacent strips. Instead of the monotonic sequence, shown in FIG. 4, of the surface proportion values $A_N$ along the axis 14, it is also possible to implement other arrangements, in which case the surface proportion values $A_N$ follow a function F which is steady at least in a portion-wise manner. In the case of a very fine division of the strips 15 to 24, the strips as such are no longer to be perceived by the naked eye, the brightness appears to change continuously.

Figure 5:
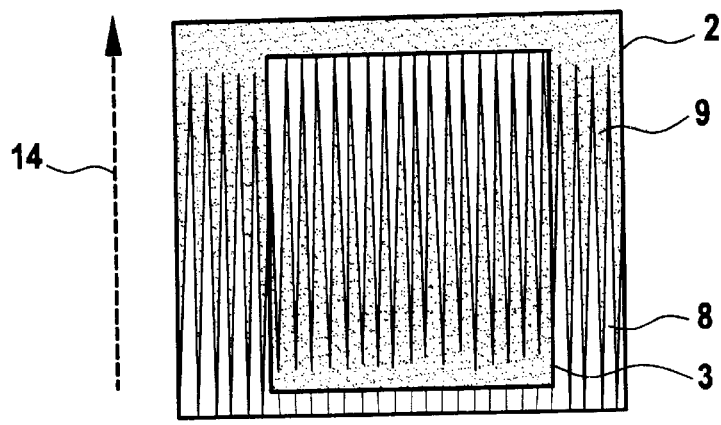
FIG. 5 shows a surface pattern with divided surface elements.

Two surface elements 2 and 3 which are divided into fine strips 15 to 24 in that way are shown in FIG. 5. The two divided surface elements 2; 3 are in mutually interlocking relationship in such a way that the one surface element 3 covers over a part of the other surface element 2. In the illustrated example the one surface element 3 lies entirely within the outer surface element 2. The one surface element 3 has the first asymmetrical diffraction grating 12 (FIG. 2a) arranged in the first surface portions 25 (FIG. 4) and the second asymmetrical diffraction grating 13 (FIG. 2b) in the second surface portions 26 (FIG. 4). In the case of the other surface element 2, the first surface portions 25 are occupied by the second asymmetrical diffraction grating 13 and in the second surface portions 26 by the first asymmetrical diffraction grating 12. In the illustrated example the strips 15 to 24 of the two divided surface elements 2 and 3 are divided in parallel relationship and equally. The illustrated pattern can however also be achieved by division of the divided surface element 2 into narrow triangular first ('light') and second ('dark') surface portions 8, 9. In the divided surface element 3 the association of the 'light' and 'dark' triangles with respect to the surface portions 8, 9, as is illustrated by drawing means, is interchanged. The authenticity feature of the element shown in FIG. 4 is once again the invariance of the distribution of the brightness distribution in relation to a rotation of the surface pattern through 180°.

Figure 6:
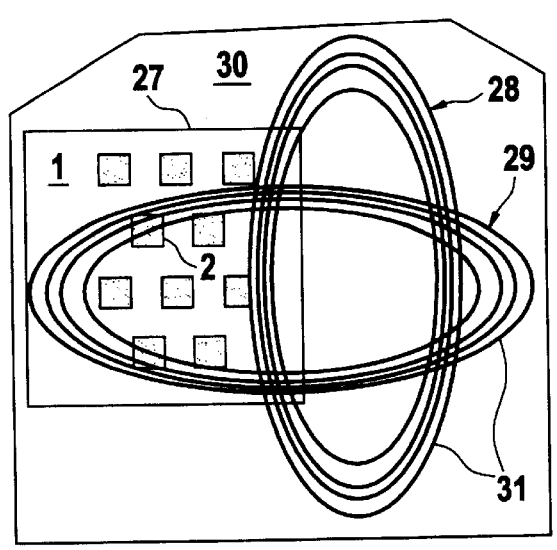
FIG. 6 shows the divided surface element with pattern elements.

The surface pattern in FIG. 6 has an arrangement 27 as illustrated in FIG. 1, wherein pattern elements 28 and 29 which are here shown by way of example in the form of oval elements are arranged over the arrangement 27. The surface pattern with the arrangement 27 and the pattern elements 28 and 29 form the motif 30 of the security element. The pattern elements 28 and 29 are band-shaped and the surfaces of bands 31 of the pattern elements 28 and 29 are occupied by microscopic relief structures (holograms, kinoforms, diffraction gratings of all kinds), mirror surfaces or transparent surfaces and/or are printed upon using conventional procedures. The bands 31 can in part cover over the background area 1 and the surface elements 2 to 7 (FIG. 1).

Figure 7:
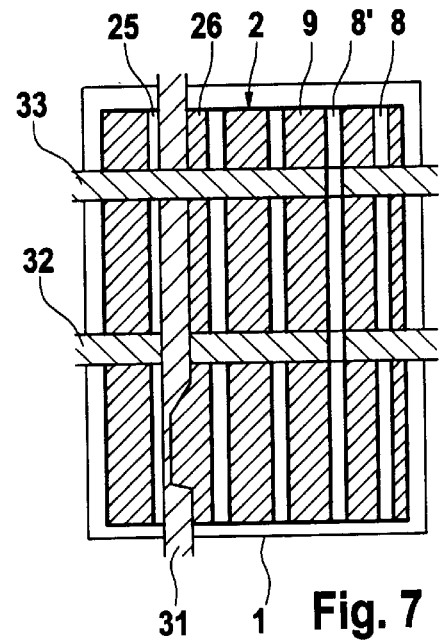
FIG. 7 shows the surface element.

FIG. 7 shows by way of example the effect on the divided surface element 2 and the background area 1. The divided surface element 2 is subdivided into the first surface portions 8, 8', 25 and the second surface portions 9, 26. Thus the first surface portion 25 and the second surface portion 26 are separated by the band 31. Further bands 32 and 33 of the pattern elements 28 (FIG. 6) cut for example the surface portions 8, 9, 25 and 26, but they are themselves interrupted by the surface portion 8'. The bands 31 to 33 can be modulated in respect of width. They partially cover over the first surface portions 8, 8', 25 and second surface portions 9, 26 and reduce their surface proportion. Such bands 31 to 33 can serve, being limited to one of the surface elements 2 to 6, as auxiliary surface portions occupied by microscopic relief structures, for independent compensation in respect of the brightness of the first surface portions 8, 8', 25 and the second surface portions 9, 26 respectively in the surface element 2 to 6. The only condition is that the auxiliary surface portions are not visible together with the first and second surface portions, for example the auxiliary surface portions are in the form of a mirror or a light-scattering structure or indeed part of a pattern element 38 or 39 which is visible from another direction. Instead of bands 31 to 33 it is also possible to use a microscript as is described in EP-A 0 330 738.

Figure 8:
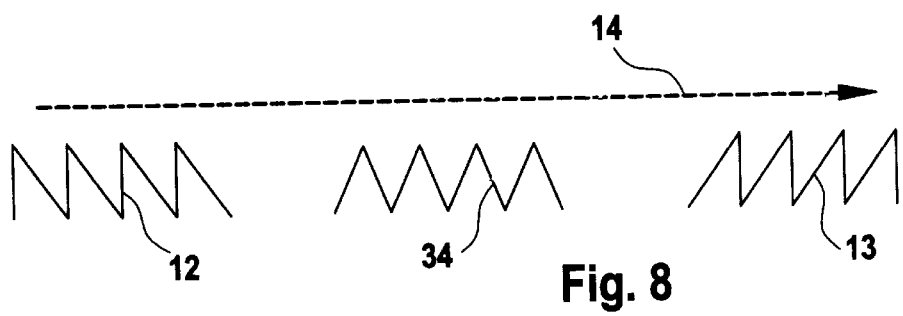
FIG. 8 shows the diffraction grating.

FIG. 8 shows three diffraction structures, the asymmetrical diffraction gratings 12, 13 and a symmetrical diffraction grating 34. The symmetrical diffraction grating 34 diffracts the perpendicularly incident light of equal intensity into the positive and negative diffraction orders. The diffraction behaviour of the symmetrical diffraction grating 34 is therefore invariant in relation to a rotation in its plane through 180°.

Figure 9:
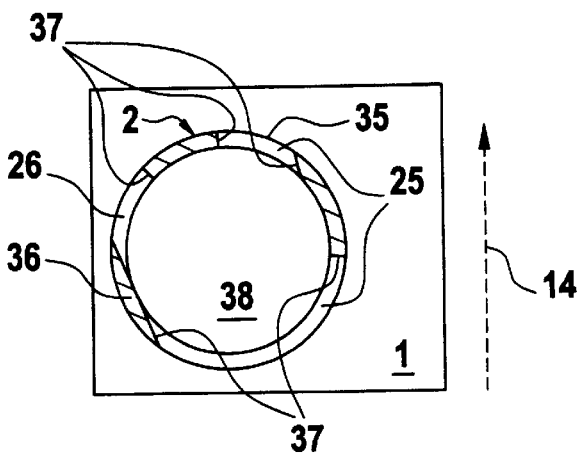
FIG. 9 shows the surface element in the form of a circular ring.

As shown in FIG. 9 the surface element 2 is of any form 35 which for example is closed in itself and forms a circular ring. The three diffraction gratings 12, 13 and 34 have grating vectors which are directed in parallel or anti-parallel relationship with respect to the common marked axis 14 and occupy the area of the strip 15 (FIG. 4), which is closed in itself, in such a way that the first surface portions 25 with the first asymmetrical diffraction grating 12 and the second surface portions 26 with the second asymmetrical diffraction grating 13 are separated by an intermediate portion 36 with the symmetrical diffraction grating 34. Separating lines 37 extend between the surface portions 25, 26 and the intermediate portion 36 perpendicularly or inclinedly relative to the boundary of the strip 15. The inclined separating line 37 permits a gradual transition from the surface portions 25 and 26 respectively to the intermediate portion 36. Upon perpendicular illumination of the surface pattern, as soon as the observer looks approximately in the direction of the common marked axis 14, he recognises the first and second surface portions 25 and 26 with different degrees of brightness in relation to the surfaces of the intermediate portions 36. After a rotational movement through 180° in the plane of the surface pattern the first and second surface portions 25, 26 become visible again, but with interchanged brightness values. The brightness of the intermediate portions 36 on the other hand does not change. An internal circular surface 38 which is afforded when using forms which are closed in themselves can be for example transparent or reflective. The form of the surface element 2, instead of being that of the circular ring 35, may also be in the shape of meander configurations, any polygons and so forth.

Figure 10:
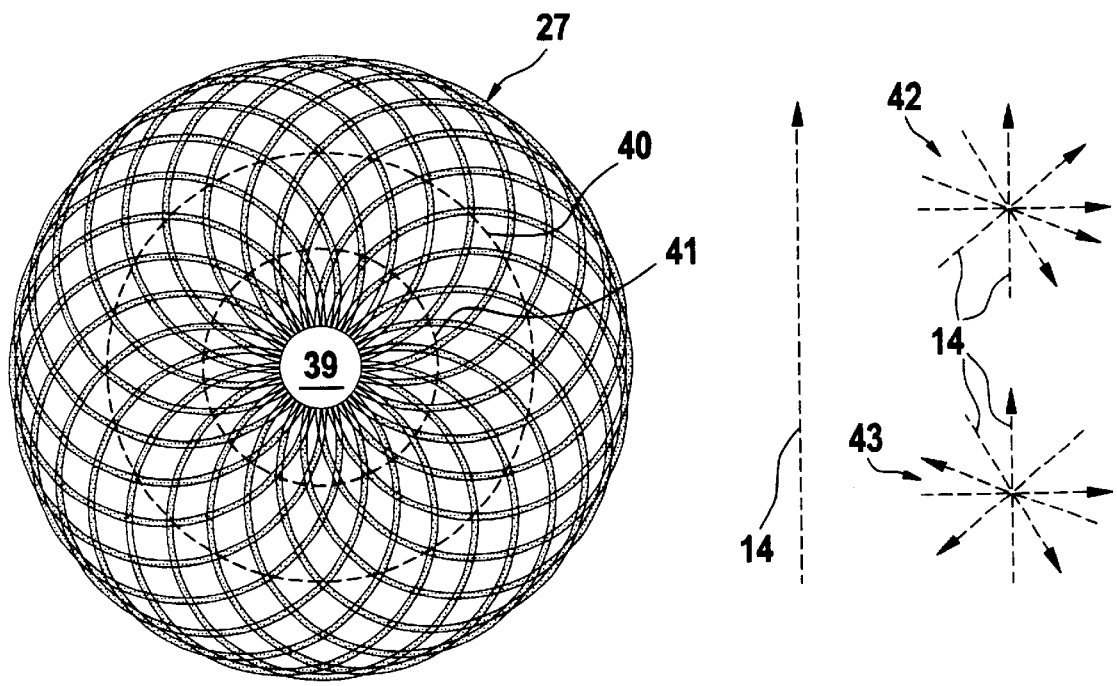
FIG. 10 shows a decorative arrangement of divided surface elements.

FIG. 10 shows an arrangement 27 of many circular rings 35 of FIG. 9, which are shown in FIG. 9 and which are regularly grouped around a center 39, with adjacent circular rings 35 overlapping. The surface portions 25 (FIG. 9), 26 (FIG. 9) and 36 (FIG. 9) are so arranged on the circular rings 35 that the grating vectors are directed towards a single common marked axis 14. The first surface portions 25 cover the circular rings 35 within the inner ring 40 and the second surface portions 26 cover the circular rings 35 outside the inner ring 41. The intermediate portions 36 (FIG. 9) extend on the circular rings 35 between the inner ring 40 and the outer ring 41. In the one viewing direction the surface pattern shows the arrangement 27 with dark circular ring portions in the inner ring 40 and light circular ring portions outside the outer ring 41, while in the other viewing direction (after a rotational movement through 180°) the brightness values are interchanged.

Superimposition of a plurality of arrangements 27 with a common center 39 but with different directions in respect of the axis 14 of each arrangement 27 affords striking kinematic effects upon rotation of the surface pattern in the plane thereof. In accordance with the angle of rotational movement the individual arrangements 27 successively light up until the 180° rotation is reached, in which respect it is only then that the brightness values are interchanged, and they remain the same for the rotational range of between 180° and 360°. The various directions of the axes 14 are oriented as in the array 42. The brightness values however can also be interchanged from one visible arrangement 27 to the next, in the entire rotational range of between 0° and 360°, when the different directions of the axes 14 are oriented as in the array 43.

The advantage of these security features is the ease of checking by virtue of a rotation of the surface pattern in the plane thereof. As described in EP-A 105 099 rotation is effected about an axis of rotation which is perpendicular to the surface pattern and which in FIG. 1 is perpendicular to the plane of the drawing. The surface elements 2 to 6 are visible when one of the marked directions 10, 11, 14, 42 (FIG. 10), 43 (FIG. 10) faces towards or away from the observer and he observes the surface pattern at the angle which is correct due to the diffraction conditions. In a situation involving directed illumination (sunshine, spotlight source) the surface elements 2 to 6 exhibit diffraction colors which, in the case of diffuse illumination or extensive artificial light sources, generally mix to form an almost white color. With diffuse light, those surface patterns enjoy the advantage that the observer can particularly easily perceive brightness gradations and interchanges of brightness differences in white light.

It is to be noted that the arrows used in the Figures for the directions 10, 11 and 14 and delimitation and separation lines are only aids for describing the situation involved and are not visible on the real surface patterns. Likewise the surface portions 8, 9 which are colored 'light' and 'dark' are only aids in describing what is involved. The expression 'visible in the common marked axis 14' means that the viewing direction has a component parallel to the axis 14. The diffracted light is diverted out of the plane of the diffraction grating. Instead of a rotation through 180°, tilting of the surface pattern beyond the reflection point (=zero diffraction order) can also implement interchange of the brightness values. The term 'brightness' is always used to mean the surface brightness, that is to say the intensity of the diffracted light sent in the viewing direction, in relation to unit of surface area of the diffraction gratings. The diffraction gratings of FIGS. 2 and 8 are shown in the ideal form; the real diffraction gratings 12, 13 and 14 however may have small rounded portions, instead of the sharp edges. Special symmetrical and asymmetrical diffraction gratings which can also be used here are described in the application filed by the present applicants on the same date at the Swiss Federal Institute for Intellectual Property.

What is claimed is:

1. A surface pattern comprising surface elements which are arranged in a mosaic-like fashion and which have microscopic relief structures and of which a plurality of divided surface elements is subdivided at least into first and second surface portions and the divided surface elements include asymmetrical diffraction gratings which have an optical-diffraction effect, wherein in the subdivided divided surface elements adjacent first surface portions are separated by second surface portions and the grating vectors of the asymmetrical diffraction gratings of the first surface portions and the second surface portions differ in respect of azimuth, wherein the asymmetrical diffraction gratings of the first surface portions of all divided surface elements have the same first value in respect of azimuth and the asymmetrical diffraction gratings of the second surface portions of all divided surface elements have the same second value in respect of azimuth, wherein the relationship of the sum of all first surface portions of the N-th divided surface element relative to the total area of the N-th divided surface element forms a surface proportion value $A_N$ specific to the N-th divided surface element, and along a predetermined marked axis all divided surface elements are arranged in accordance with their surface proportion value $A_N$ between the divided surface elements with the surface proportion value $A_N=0$ and $A_N=1$ in the mosaic of all elements.

2. A surface pattern according to claim 1, wherein the first surface portions and the second surface portions measure less than 1 mm at least in one direction.

3. A surface pattern according to claim 1, wherein the asymmetrical diffraction gratings of the first surface portions differ from the asymmetrical diffraction gratings of the second surface portions in respect of the value of the azimuth by 180°.

4. A surface pattern according to claim 1, wherein the first surface portions and the second surface portions of the surface element are mutually interlocked strips of similar form.

5. A surface pattern according to claim 1, wherein the asymmetrical diffraction gratings of the first and second surface portions of all divided surface elements have the same grating parameters with the exception of azimuth.

6. A surface pattern according to claim 1, wherein at least the divided surface elements are arranged on a background area and the background area is occupied by the first asymmetrical diffraction gratings of the first surface portions.

7. A surface pattern according to claim 1, wherein at least two of the divided surface elements are mutually interlocked in such a way that one surface element covers over a part of the other surface element and the one surface element has the first asymmetrical diffraction grating in the first surface portions and the second asymmetrical diffraction grating in the second surface portions and in the other surface element the first surface portions are occupied by the second asymmetrical diffraction grating and in the second surface portions by the first asymmetrical diffraction grating.

8. A surface pattern comprising surface elements which are arranged in a mosaic-like fashion and which have microscopic relief structures and of which divided surface elements are subdivided at least into first and second surface portions, and which divided surface elements include asymmetrical diffraction gratings which have an optical diffraction effect, wherein the grating vectors of the asymmetrical diffraction gratings of the first surface portions and the second surface portions differ in respect of azimuth, wherein the asymmetrical diffraction gratings of the first surface portions of all divided surface elements have the same first value in respect of azimuth and the asymmetrical diffraction gratings of the second surface portions of all divided surface elements have the same second value in respect of azimuth, wherein the subdivided surface elements are subdivided into strips and the strips are subdivided into first and second surface portions, in each strip which is subdivided into first and second surface portions adjacent first surface portions are separated by at least one second surface portion, in a N-th one of the strips the sum of all first surface portions of the N-th strip relative to the total area of the N-th strip has a surface proportion value $A_N$, and along a predetermined marked axis all subdivided strips are arranged in accordance with their surface proportion value $A_N$ between the strips with the surface proportion value $A_N=0$ and $A_N=1$ in the mosaic of all elements.

9. A surface pattern according to claim 8, wherein the subdivided surface element is subdivided into the strips in transverse relationship with the marked axis.

10. A surface pattern according to claim 8, wherein the surface element has a figure which is closed in itself and encloses an internal surface.

11. A surface pattern according to claim 8, wherein the width of the strips is a millimeter or less.

12. A surface pattern according to claim 8, wherein the first asymmetrical diffraction grating of the first surface portions of the strips and the second asymmetrical diffraction grating of the second surface portions of the strips have a difference in azimuth of 180°.

13. A surface pattern according to claim 8, wherein at least two of the divided surface elements are mutually interlocked in such a way that one surface element covers over a part of the other surface element and the one surface element has the first asymmetrical diffraction grating in the first surface portions and the second asymmetrical diffraction grating in the second surface portions and in the other surface element the first surface portions are occupied by the second asymmetrical diffraction grating and in the second surface portions by the first asymmetrical diffraction grating.

14. A surface pattern comprising surface elements which are arranged in a mosaic-like fashion and which have microscopic relief structures and of which divided surface elements are subdivided at least into first and second surface portions, and which divided surface elements include asymmetrical diffraction gratings which have an optical-diffraction effect, wherein the grating vectors of the asymmetrical diffraction gratings of the first surface portions and the second surface portions differ in respect of azimuth, wherein the asymmetrical diffraction gratings of the first surface portions of all divided surface elements have the same first value in respect of azimuth and the asymmetrical diffraction gratings of the second surface portions of all divided surface elements have the same second value in respect of azimuth, wherein the grating vectors of the asymmetrical diffraction gratings are oriented along a predetermined marked axis, the first surface portions and the second surface portions are separated within the surface element by intermediate portions, and the surface of the intermediate portions is occupied by a symmetrical diffraction grating whose grating vector is parallel to the marked axis.

15. A surface pattern according to claim 14, wherein the surface element has a figure which is closed in itself and encloses an internal surface.

16. A surface pattern according to claim 14, wherein at least two of the divided surface elements are mutually interlocked in such a way that one surface element covers over a part of the other surface element and the one surface element has the first asymmetrical diffraction grating in the first surface portions and the second asymmetrical diffraction grating in the second surface portions and in the other surface element the first surface portions are occupied by the second asymmetrical diffraction grating and in the second surface portions by the first asymmetrical diffraction grating.

* * * * *